(12) United States Patent
LaSusa (10) Patent No.: US 7,546,793 B2
(45) Date of Patent: Jun. 16, 2009

(54) WINDOW COMPONENT NOTCHING SYSTEM AND METHOD

(76) Inventor: Frank LaSusa, 674 N. 1300 West, Clinton, UT (US) 84015

( * ) Notice: Subject to any disclaimer, the term of this patent is extended or adjusted under 35 U.S.C. 154(b) by 65 days.

(21) Appl. No.: 11/539,846

(22) Filed: Oct. 9, 2006

(65) Prior Publication Data

US 2007/0175039 A1    Aug. 2, 2007

Related U.S. Application Data

(63) Continuation-in-part of application No. 10/175,021, filed on Jun. 18, 2002, now Pat. No. 7,117,576.

(51) Int. Cl.
*B26D 1/12* (2006.01)

(52) U.S. Cl. ............... 83/692; 83/671; 83/581; 83/522.19; 83/917

(58) Field of Classification Search .......... 83/917, 83/692, 671, 522.19, 581, 72; 700/167, 114, 700/160
See application file for complete search history.

(56) References Cited

U.S. PATENT DOCUMENTS

| | | | |
|---|---|---|---|
| 2,037,611 A | 4/1936 | Antrim | |
| 2,047,835 A | 7/1936 | Prew | |
| 2,126,544 A | 8/1938 | Everhard | |
| 2,219,594 A | 10/1940 | Lang | |
| 2,613,740 A * | 10/1952 | Drain | 83/578 |
| 2,781,111 A | 2/1957 | Kunkel | |
| 2,952,342 A | 9/1960 | Schnittker | |
| 3,074,772 A | 1/1963 | Kessler et al. | |
| 3,087,207 A | 4/1963 | Styra | |
| 3,097,684 A * | 7/1963 | Le Tarte | 72/339 |
| 3,227,025 A * | 1/1966 | MacMillan | 83/581 |
| 3,287,041 A | 11/1966 | Cohen | |
| 3,299,759 A * | 1/1967 | Johnson et al. | 83/581 |
| 3,305,998 A | 2/1967 | Deisenroth | |
| 3,315,431 A | 4/1967 | Yake | |
| 3,327,766 A | 6/1967 | Kurtz | |
| 3,348,353 A | 10/1967 | Cartegena | |
| 3,376,670 A | 4/1968 | Jones | |
| 3,455,196 A * | 7/1969 | Kreider | 83/454 |
| 3,484,126 A | 12/1969 | Hook | |
| 3,777,605 A * | 12/1973 | Spier | 83/452 |
| 3,802,105 A | 4/1974 | Bendix | |
| 3,803,960 A | 4/1974 | Pearl et al. | |
| 3,854,248 A | 12/1974 | Dayus | |
| 3,855,887 A | 12/1974 | Pearl et al. | |
| 3,864,997 A | 2/1975 | Pearl et al. | |

(Continued)

FOREIGN PATENT DOCUMENTS

JP    01064794    3/1989

(Continued)

*Primary Examiner*—Essama Omgba
(74) *Attorney, Agent, or Firm*—Snell & Wilmer L.L.P.

(57) ABSTRACT

A system and method for producing window components using polymer based, metallurgy based, extruded, injection molded, or wooden lineal material. The lineal material is notched at intervals calculated to include a stretch treatment and folded to form window components such as window sashes, frames, and the like. Internal reinforcing members may be welded within the joints formed by folding at the notches. The notching system and method provide low cost, highly reliable, low defect production of multi-sided window components from a continuous piece of lineal material.

10 Claims, 7 Drawing Sheets

U.S. PATENT DOCUMENTS

| | | | |
|---|---|---|---|
| 4,064,644 A | 12/1977 | Warner et al. | |
| 4,269,255 A | 5/1981 | Nailor et al. | |
| 4,327,142 A | 4/1982 | Norzi | |
| 4,407,100 A | 10/1983 | Huelsekopf | |
| 4,460,737 A | 7/1984 | Evans et al. | |
| 4,574,553 A | 3/1986 | Lisec | |
| 4,597,232 A | 7/1986 | Lingemann | |
| 4,740,397 A | 4/1988 | Santo | |
| 4,831,910 A * | 5/1989 | Poulsen | 83/693 |
| 4,930,384 A * | 6/1990 | Nakatsuji | 83/54 |
| 4,941,288 A | 7/1990 | Morton | |
| 5,155,956 A | 10/1992 | Norment et al. | |
| 5,189,841 A | 3/1993 | Arbetter | |
| 5,456,099 A | 10/1995 | Lipari | |
| 5,491,940 A | 2/1996 | Bruchu | |
| 5,540,019 A | 7/1996 | Beske et al. | |
| 5,555,684 A | 9/1996 | Galowitz et al. | |
| 5,585,155 A | 12/1996 | Heikkila et al. | |
| 5,603,585 A | 2/1997 | Bruchu et al. | |
| 5,620,648 A | 4/1997 | Volkmann et al. | |
| 5,622,017 A | 4/1997 | Lynn et al. | |
| 5,714,234 A | 2/1998 | Robertson | |
| 5,724,246 A | 3/1998 | Heil | |
| 5,740,713 A * | 4/1998 | Korb | 83/582 |
| 5,799,453 A | 9/1998 | Westerlund | |
| 5,901,509 A | 5/1999 | Rose | |
| 5,943,933 A | 8/1999 | Evans et al. | |
| 5,970,769 A | 10/1999 | Lipari | |
| 6,047,514 A | 4/2000 | Verch | |
| 6,063,458 A | 5/2000 | Robertson et al. | |
| 6,073,412 A | 6/2000 | Verch | |
| 6,266,940 B1 | 7/2001 | Reichert | |
| 6,295,788 B2 | 10/2001 | Reichert | |
| 6,313,433 B1 | 11/2001 | Sukman et al. | |
| 6,329,030 B1 | 12/2001 | Lafond | |
| 6,377,864 B1 | 4/2002 | Lindstrom | |
| 6,423,935 B1 | 7/2002 | Hackel et al. | |
| 6,678,934 B1 | 1/2004 | LaSusa | |
| 6,954,676 B2 | 10/2005 | Dorsch | |
| 6,959,633 B2 * | 11/2005 | Brady | 83/522.19 |
| 7,117,576 B2 * | 10/2006 | LaSusa | 29/458 |
| 2002/0048822 A1 | 4/2002 | Rittenburg et al. | |

FOREIGN PATENT DOCUMENTS

WO    WO2004110786    12/2004

* cited by examiner

| | | | | | | | | | | | |
|---|---|---|---|---|---|---|---|---|---|---|---|
| Package Window | Assemble Balances, Hardware, Window Pane | Join Corners/Ends | Fold Lineal | Punch Weeps or Drains | Additional Forming | Form Third Notch | Form Second Notch | Form First Notch | End Cut | Position Lineal | Apply Tracking Indicia |
| 411 | 410 | 409 | 408 | 407 | 406 | 405 | 404 | 403 | 402 | 401 | 400 |

WINDOW COMPONENT NOTCHING SYSTEM AND METHOD

CROSS-REFERENCE TO RELATED APPLICATIONS

This application is a continuation-in-part of U.S. patent application Ser. No. 10/175,021, filed on Jun. 18, 2002, now U.S. Pat. No. 7,117,576, which in turn is related to U.S. patent application Ser. No. 09/679,220, filed on Oct. 3, 2000, now U.S. Pat. No. 6,678,934, which in turn is related to Provisional Patent Application Ser. No. 60/157,625, which was filed on Oct. 4, 1999, and priority is claimed thereto.

FIELD OF INVENTION

This invention relates to systems and methods for the manufacture of windows. More specifically, this invention relates to systems and methods for efficient production of improved window systems from polymeric or metallic components.

BACKGROUND OF THE INVENTION

Window systems are available in a wide range of sizes, shapes, and styles, such as, for example, French, casement, pivoting, sliding, folding, and sash windows. In conventional window systems, the window pane is enclosed by a first frame referred to herein as a "sash." The sash may slide along tracks formed in a supporting frame or "casing," or may be attached with hinges to the sides of the casing. Thus, the term "frame," as used herein, may refer to a sash or a casing. The sash in a rectangular hinged window system typically includes a top horizontal rail, lower horizontal rail, vertical hanging stile and vertical locking stile. The casing similarly includes a top horizontal rail or "head," lower horizontal rail or "sill," and vertical side members.

These various frame components are typically sectioned from longer lineal material (e.g., vinyl or aluminum extrusions) into separate components that will then be aligned and attached together. Sectioning of these separate components typically includes cutting entirely through the lineal material at two opposite angles producing numerous pie-shaped scraps and other scraps and resulting in a significant cumulative waste of the lineal material.

Furthermore, excessive operator time and equipment set-up and handling are typically required to properly align and weld each of the joints of the sash and casing. The separate components are each aligned using fixtures configured for the finished window shape and the aligned components are connected together at the respective corner joints. In vinyl window systems, these corner joints are typically welded with a single-point, two-point or four-point vinyl thermal welder, or may be glued or chemically bonded as known in the window industry. Welding of secondary or primary materials often creates flashing or "sprue" waste at the welded joint requiring tedious and labor intensive flashing removal, joint cleaning or other preparation.

Thus, a need exists for a more efficient, cost-effective, and improved system and method of forming and joining frame components for use in window systems.

SUMMARY OF THE INVENTION

While the way that the present invention addresses the disadvantages of the prior art will be discussed in greater detail below, in general, a system and method of manufacturing window systems according to the present invention includes an automated notching machine ("notcher") for forming notches in lineal material ("lineal") such that the continuous lineal may be folded and joined into a desired window frame configuration.

The notches in the lineal define connected intermediate and end sections of the notched lineal and the length of each section is adjusted by a stretch treatment based on the selected lineal profile and frame shape. The notcher may be configured to perform the stretch treatment calculations or may simply receive appropriate instructions at a controller to position the lineal for notching. The notcher forms notches positioned along the lineal such that the lengths of the intermediate sections are reduced by up to about 0.5 inches and those of the end sections by up to about 0.25 inches relative to the target finished production lengths.

In a preferred embodiment, an intermediate section length is reduced according to a first notch stretch treatment and an end section length is reduced by approximately half of the first notch stretch treatment. This allows the initially unequal intermediate and end sections to form substantially equal opposing sides of an equilateral frame upon folding of the notched lineal. The continuous portion of the lineal that stretches around the end of each folded joint protects against joint separation and provides a significant structural advantage over known joints formed from fully sectioned components. Folding of connected sections provides improved joint and frame alignment over joints and frames made of separate sections because the connected sections are made from the same lineal in the same processes, minimizing variations in material, section length, section profile, section end characteristics, and the like.

In various embodiments, the notched lineal is folded into a finished frame shape and the folded intermediate joints and abutting end joints are fixed. In other embodiments, the continuous notched lineal forms multiple sides of a frame and a separate lineal section forms another side of the frame. The end joints and folded joints may further include internal or external reinforcing structures. For example, the frame joints may be fixed using internal reinforcing members that are sonically welded within the lineal. Exemplary sonic-welded internal reinforcing members are described in Applicant's U.S. Patent Application No. 2004/0231283 and alternative reinforcing members are described in Applicant's U.S. Patent Application No. 2005/0028480, both of which are incorporated herein in their entirety.

Therefore, it is a general object of this invention to provide a system and method for the construction of universal window systems, using advanced components of a polymer-based or a metal- or alloy-based product.

It is a further object of this invention to provide a system and method for the construction of universal window systems that reduce labor costs.

It is a still further object of this invention to provide a system and method for the construction of universal window systems having improved structural joints.

Another object of this invention is to provide a system and method for the construction of universal window systems that make use of automation techniques to improve product quality.

A further object of this invention is to provide a system and method for the construction of universal window systems that produce window frames using a continuous lineal.

A still further object of this invention is to provide a system and method for the construction of universal window systems using extruded, injected, or other composite materials.

A still further object of this invention is to provide a system and method for the construction of universal window systems that significantly reduces the production floor space required for mass-production.

These and other objects of this invention will be readily apparent to those of ordinary skill in the art upon review of the following drawings, detailed description and claims.

BRIEF DESCRIPTION OF THE DRAWING FIGURES

A more complete understanding of the present invention may be derived by referring to the detailed description and claims when considered in connection with the drawing Figures, wherein like reference numerals refer to similar elements throughout the Figures.

DETAILED DESCRIPTION OF EXEMPLARY EMBODIMENTS

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, and the like and still fall within the scope of the present invention. Thus, the detailed description herein is presented for purposes of illustration only and not of limitation.

In accordance with various embodiments of the present invention, a notcher is configured to notch, cut, or otherwise form lineal material to be foldable into a window frame. The notcher removes portions of the lineal material to create a foldable joint between frame sections. The notcher further forms the ends of the lineal to be joined together or to separate excess material from frame section ends. The notcher may also cut or notch a nail fin or other portion that could be used for fastening around the outer perimeter of the window frame to allow for folding of the lineal. The nail fin is used to secure the window frame within the window opening in a structure. The nail fin may have preformed nail holes or the nail holes may be formed in connection with the notching system of the present invention. Alternatively, a nail fin is any structure formed on the outer perimeter of a frame that is useful for securing a frame within a window opening. Any number of additional fins, flashing, or features may be formed on the frame exterior for functional or decorative purposes.

The notcher is controllable to form any number, depth, angle, or shape of notches in the lineal to produce a desired finished frame shape. The notcher may form notches using any number or combination of saws, cutters, blades, punches, dies, mills, routers, high-pressure water jet cutters, heat or torch cutters, radio frequency (RF) or sonic cutters or any other suitable cutter or tooling now know or hereafter developed. Additionally, the notcher tooling or other tooling may be used to form weep holes, fastener openings, or to otherwise form the lineal. In accordance with an aspect of an exemplary embodiment, the notcher is coupled to a controller configured to carry out notching sequence instructions provided by a processor based on various parameters, such as, the frame shape, lineal material profile and calculated stretch treatments for each foldable section of the frame.

Figure 1:
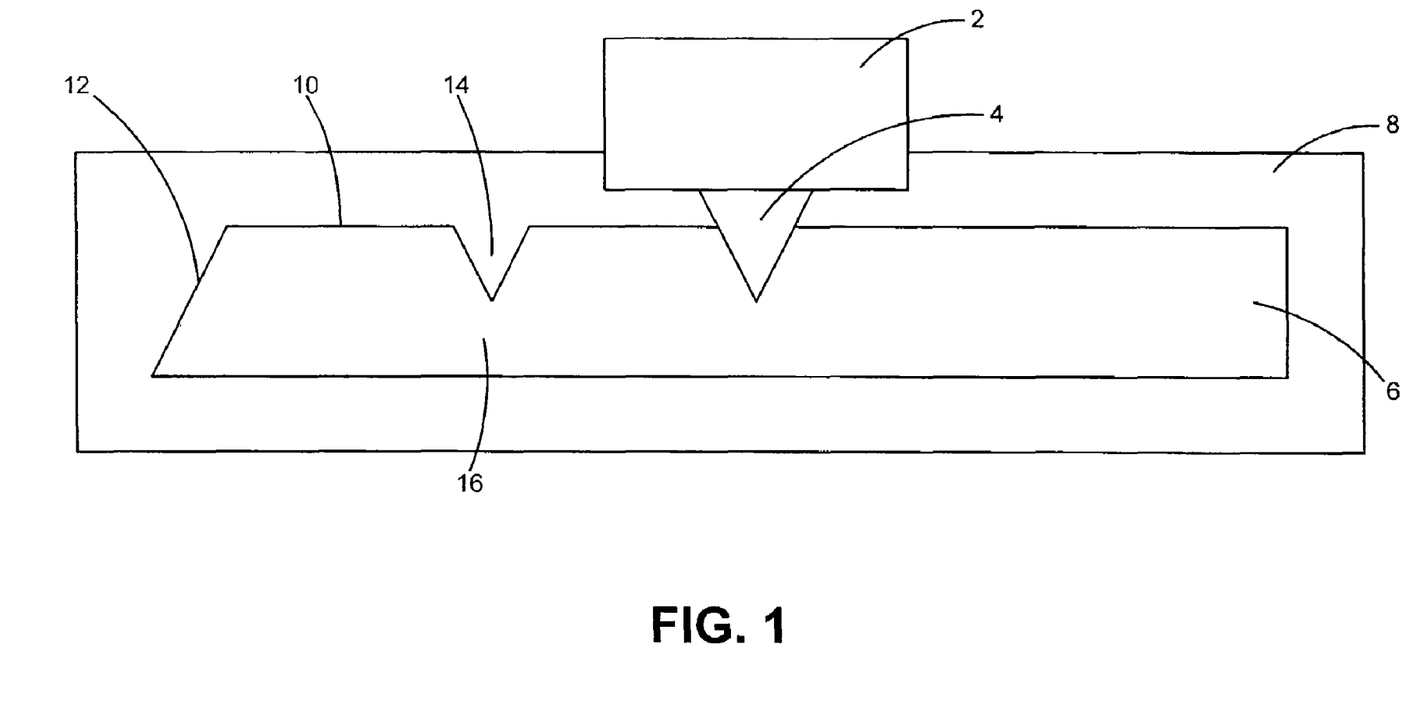
FIG. 1 illustrates an exemplary notching system according to one embodiment of the present invention.

With reference to the Figures, FIG. 1 shows a portion of notcher 2 including a notching tool 4 configured to be activated to form a notch in a lineal 6. Lineal 6 is conveyed along a support 8 past notcher 2 to various positions corresponding to notches to be formed. Lineal 6 is shown here with a first end section 10 defined by a diagonal end cut 12, an intermediate notch 14 and foldable portion 16. It will be appreciated that either lineal 6 or notcher 2 may be fixed and the other moveable or both may be moveable during any stage of the notching process. Similarly, any number of notching tools 4 may be used to simultaneously or sequentially form notches in lineal 6.

End cut 12, intermediate notch 14, and any number of other notches or cuts may be made using notching tool 4 or additional tooling associated with notcher 2. For example, notching tool 4 may be extended to sever lineal 6 to form an end cut or may be retracted to form notch 14 to any desired depth. Similarly, notching tool 4 may be positioned to form notches of any desired angle or shape. Notching tool 4 may include any number or combination of saws, cutters, blades, punches, dies, or any other tooling suitable to form lineal 6. For example, notching tool 4 may include a pair of rotary blades angled towards a common apex. The blades may be independently moveable to form a desired angle and may be jointly moveable to engage lineal 6.

Figure 2:
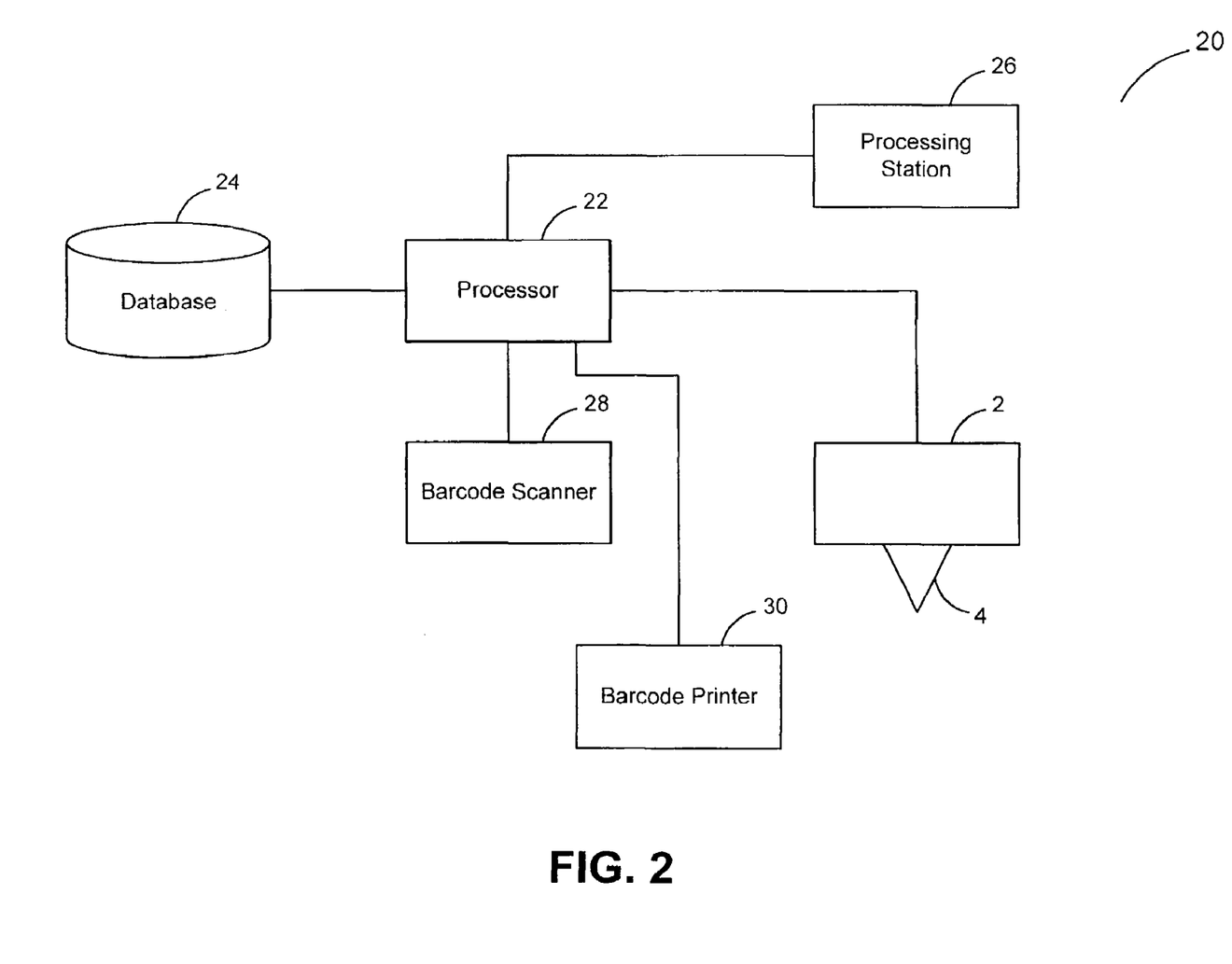
FIG. 2 illustrates an exemplary notching system network according to one embodiment of the present invention.

FIG. 2 shows an exemplary notching system configuration 20 in which a notcher 2 includes a controller (not shown) for activating or otherwise controlling notching tool 4. In accordance with one embodiment, the controller of notcher 2 is in communication with a processor 22 that provides instructions regarding the position of notches to be formed. Processor 22 is coupled to a production database 24 containing window component data that is used to calculate notch positions as a function of finished production shapes, lengths, and stretch treatment calculations.

In accordance with the present invention, stretch treatments account for the lineal profile dimensions, material properties, angle of each folded joint, thickness of the foldable portion, and the like. Stretch treatments may vary between different lineal sections according to the number of folds associated with or defining each section. Stretch treatments are calculated as a function of the material and dimension of the lineal and the depth and shape of notch formed in the lineal. For example, a larger thick-walled lineal profile will require a larger stretch treatment than a smaller thin-walled lineal profile. Similarly, notches of different depths in the same lineal material will require different stretch treatments for the intermediate lengths. The stretch treatment is calculated based on these and other parameters to achieve the desired yield of the lineal material Stretch treatments may be precalculated for more common window configurations and may be calculated as needed for custom window configurations. According to the stretch treatment calculations in one embodiment, an intermediate section length is reduced according to a first notch stretch treatment and an end section length is reduced by approximately half of the first notch stretch treatment. For example, the lengths of the intermediate sections may be reduced by up to about 0.5 inches and those of the end sections by up to about 0.25 inches relative to the target finished production lengths. This allows intermediate and end sections to form substantially equal opposing sides of a folded frame or to otherwise form a frame having precise dimensions.

Processor 22 is optionally coupled or networked to additional materials processing stations to coordinate production. For example, processor 22 may be coupled to a bar code scanner 28 or other data input device to capture data regarding a particular lineal 6 to be notched. Processor 22 may be further coupled to a bar code label printer 30 or other data output device for providing tracking indicia on the workpiece. Tracking indicia may be used to retrieve data from production database 24 at any number of processing stations 26. For example, tracking indicia applied before or after notching may be used to inform instruction displays for operators at subsequent processing stations 26, such as a folding station, welding station, assembly station, and shipping station.

Figure 3A:
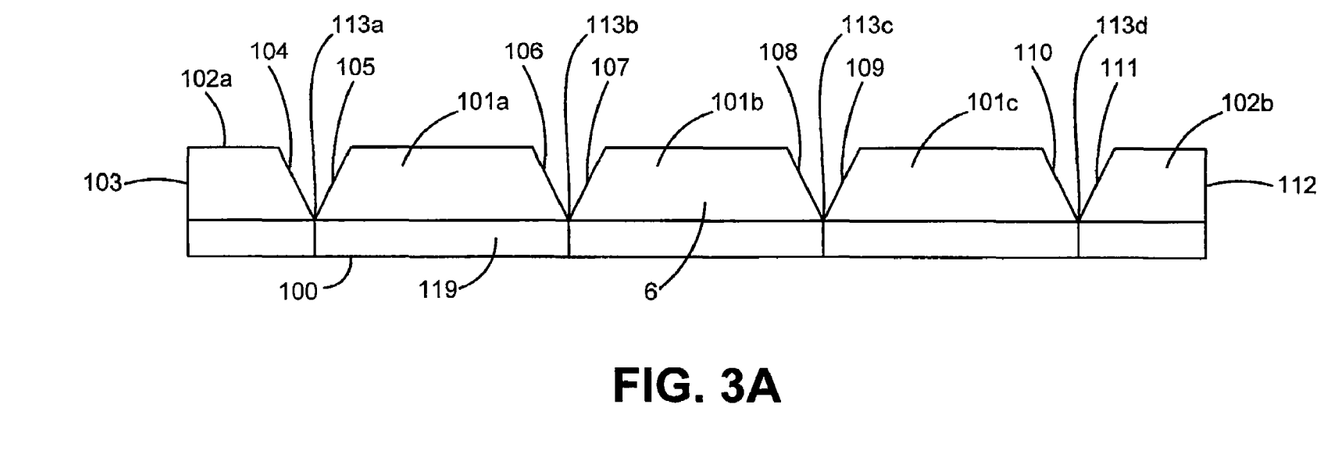
FIG. 3a illustrates an exemplary foldable lineal, notched using the system and method of this invention.

FIG. 3a shows a foldable lineal 6 manufactured using the notching system and method of this invention. Foldable lineal 6 has three generally elongate sections 101a, 101b, 101c and two half sections 102a, 102b, each connected by foldable connections 113a, 113b, 113c, 113d to an adjacent section. In alternative embodiments, when it is desired to have windows with non-rectangular shapes, the number of sections may be increased or reduced. For example, a triangular shaped window may have only two long sections and two half sections. In another example, an octagonal shaped window may have seven long sections and two half sections. Connections 113a, 113b, 113c, 113d are flexible permitting folding of elongate sections 101a, 101b, 101c and half sections 102a, 102b. Elongate sections 101a, 101b, 101c and half sections 102a, 102b are preferably made of a plastic, metallic, or composite material that is extruded, molded, cut, milled, routed into a desired shape or profile. While sections 101a, 101b, 101c are shown, in this embodiment, as being of generally the same folded length, in alternative embodiments, the sections 101a, 101b, 101c may have different lengths as appropriate to the desired window shape.

Figure 5A:
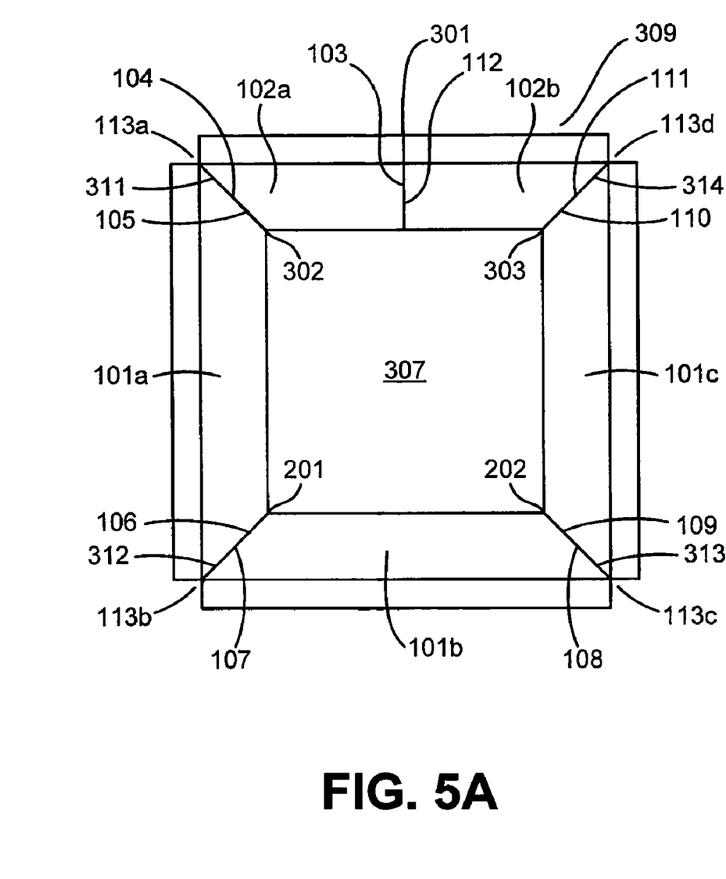
FIG. 5a illustrates an exemplary equilateral window frame formed by folding a notched lineal.

Each intermediate section 101a, 101b, 101c is provided with two diagonal cut notched portions (respectively 105, 106; 107, 108; and 109, 110). These diagonal cut notched portions 105, 106, 107, 108, 109, 110 are shown having an angle of 45 degrees, however, in alternative embodiments this angle may be either increased or decreased as necessary in order to facilitate the joining of two adjacent diagonal notched portions, to thereby produce a window component having the desired shape. The lineal material may include a nail fin 119 that may also be cut or notched to facilitate folding of connections 113a, 113b, 113c, 113d. Similarly, the notch may be formed primarily in one section (e.g., a 90 degree notch) such that the joint is substantially aligned with an adjacent section. Ends 103 and 112 are, in this embodiment, at approximately 90 degrees from the base 100 of the window portions, thereby facilitating the joining of ends 103, 112, as shown in FIG. 5a.

Figure 3B:
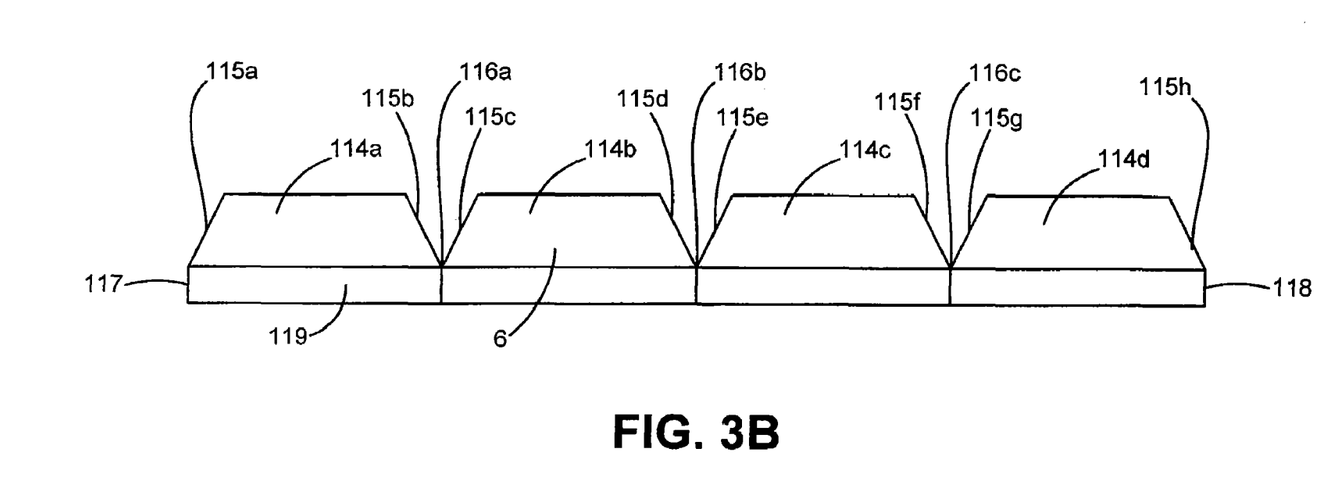
FIG. 3b illustrates an alternative foldable lineal, notched using the system and method of this invention.

FIG. 3b shows an alternative foldable window component, manufactured using the notcher system and method of this invention. This second embodiment has four generally elongate sections 114a, 114b, 114c, 114d connected respectively by connections 116a, 116b, 116c to an adjacent section. In alternative embodiments, when it is desired to have windows with non-rectangular shapes, the number of sections can be increased or reduced. For example, a triangular shaped window may have only three sections. In another example, an octagonal shaped window may have eight sections. Connections 116a, 116b, 116c are flexible permitting folding of elongate sections 114a, 114b, 114c and 114d. While sections 114a, 114b, 114c, 114d are shown, in this embodiment, as being of generally the same length, in alternative embodiments sections 114a, 114b, 114c, 114d may have different lengths, as appropriate for the desired window shape.

Figure 5B:
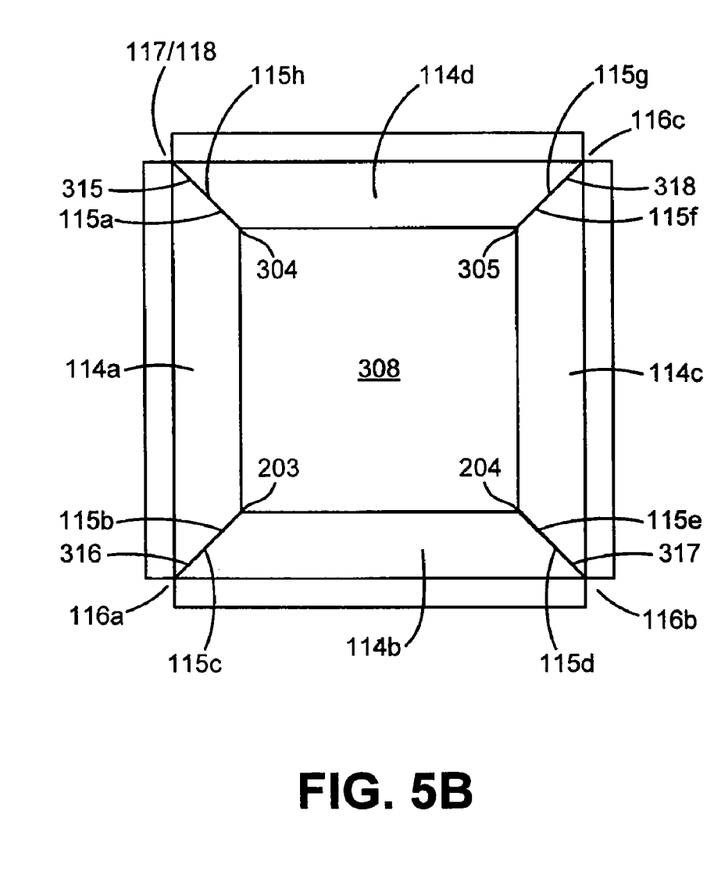
FIG. 5b illustrates an alternative completed window frame formed by folding a notched lineal.

Each section 114a, 114b, 114c, 114d is provided with two diagonal cut notched portions (respectively 115a, 115b; 115c, 115d; 115e, 115f; 115g, 115h). These diagonal cut notched portions 115a, 115b, 115c, 115d, 115e, 115f, 115g, 115h are shown having an angle of 45 degrees, however, in alternative embodiments this angle may be either increased or decreased or shifted between sections as necessary in order to facilitate joining of two adjacent sections, to thereby produce a window component having the desired shape. Ends 117, 118 are joined as shown in FIG. 5b to form a window frame.

Figure 4A:
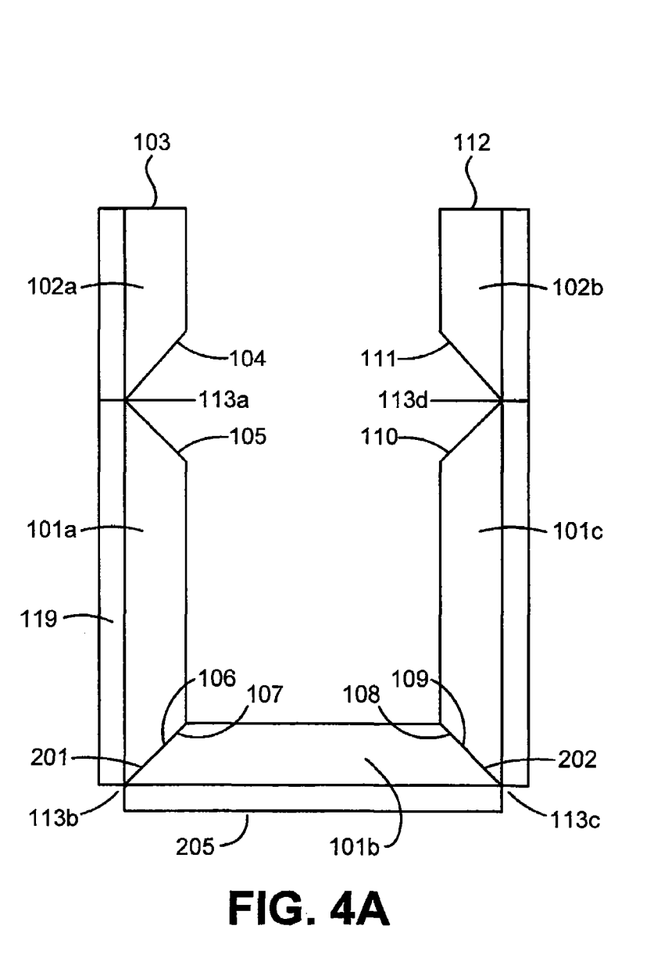
FIG. 4a illustrates a notched lineal folded at notches defining an intermediate section.

FIG. 4a shows the notched foldable lineal of FIG. 3a, folded such that portions 106, 107 and 108, 109 are brought into contact and joined to form corners 201 and 202 and thereby the bottom 205 of the window frame.

Figure 4B:
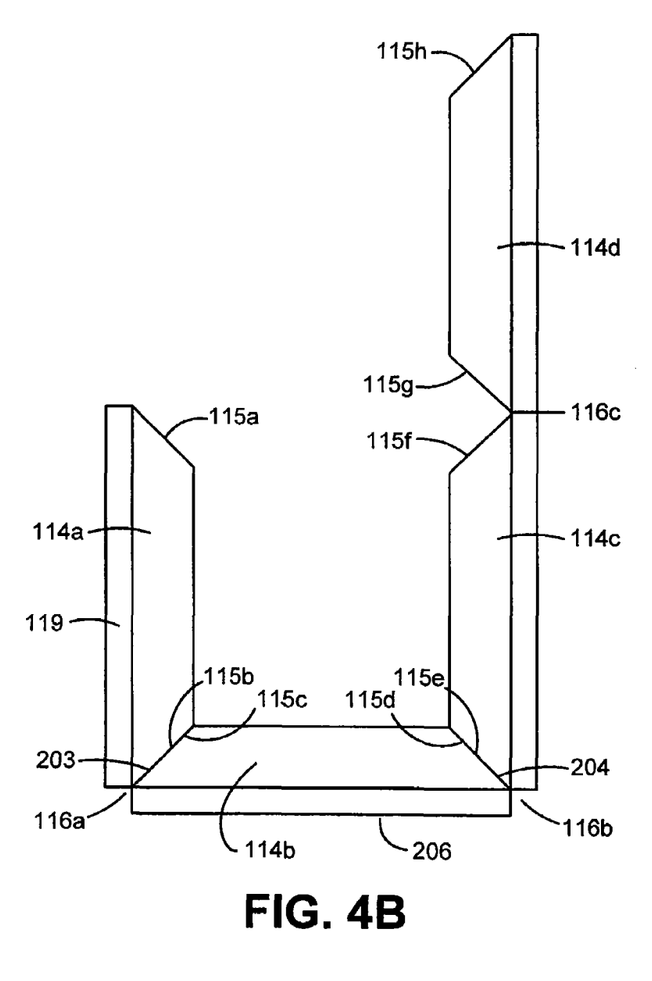
FIG. 4b illustrates an alternative notched lineal folded at notches defining an intermediate section.

FIG. 4b shows the notched foldable lineal of FIG. 3b, folded such that portions 115b, 115c and 115d, 115e are brought into contact and joined to form corners 203 and 204 and thereby the top 206 of the window frame. As described above, the length of section 114c is reduced by a first stretch treatment for foldable connections 116b and 116c while section 114a is reduced by a second stretch treatment equal to approximately half of the first stretch treatment for foldable connection 116a.

FIG. 5a shows a completed equilateral window frame formed by folding the notched lineal of FIG. 3a. Ends 103 and 112 are connected forming a joint 301 at the top 309 of the window component. Portions 104, 105 and 110, 111 are brought into contact and joined to form corners 302 and 303 and to define an interior 307 suitable for holding and retaining a pane of glass or other material. Joints 301, 311, 312, 313, 314 may be fixed by welding, bonding, or fastening using heat, RF systems, sonic energy, adhesives, internal reinforcing members, bolts, screws, pins, clips, cables, and the like.

FIG. 5b shows an equilateral window frame formed by folding a notched lineal of FIG. 3b. Ends 117 and 118 are connected forming a joint 315 from portions 115a, 115h, thereby forming a corner 304. Portions 115f, 115g are brought into contact and joined to form corner 305 and to define an interior 308 suitable for holding and retaining a pane of glass or other material. Joints 315, 316, 317, 318 may be fixed by welding, bonding, or fastening using heat, sonic energy, RF systems, adhesives, internal reinforcing members, bolts, screws, pins, clips, cables, and the like can be substituted without departing from the concept of this invention.

Figure 6:
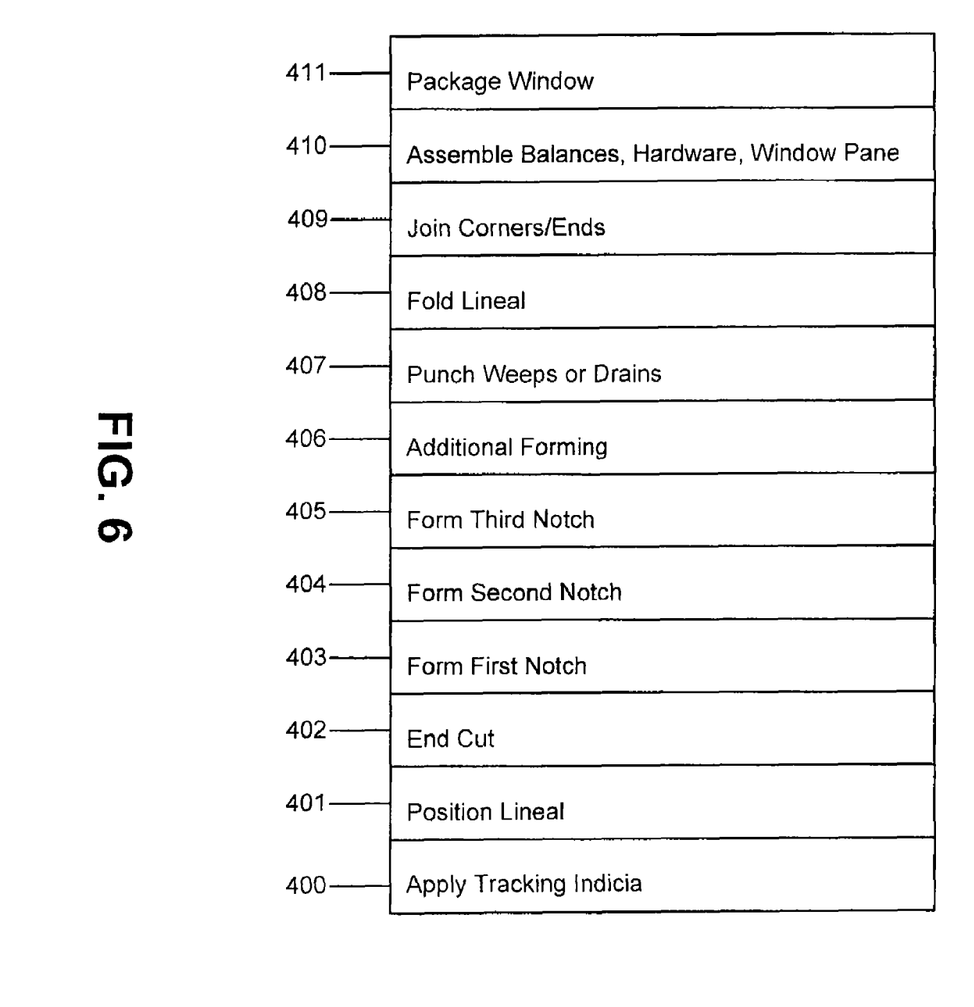
FIG. 6 illustrates a process flow diagram of a preferred method of the invention.

FIG. 6 shows a process flow diagram of an exemplary method or operation of the notching system of the present invention. Identification markings are applied (400) to permit control and tracking of window components. Initially, lineal material 6 is positioned (401) relative to notching system. Lineal material 6 may be end cut (402) by the notcher or by an associated saw or mill machine. A controller activates notching tool 4 at a predetermined position to form a first notch (403), at a second predetermined position to form a second intermediate notch (404), and at a third predetermined position to form a third notch (405).

Lineal 6 may then be positioned on a press, drill, or router for additional forming (406) of lifter or balance holding features and for punching of weeps or drains (407). Weeps provide ventilation and drainage points in the window component. Notched lineal 6 is folded into the finished shape (408) and the respective corner and/or end portions are joined together (409). The balances, hardware, and window pane or other medium are assembled with the window component (410), which is then packaged for shipment (411). Additional intermediate processing may be performed to remove loose material or rough edges or otherwise finish the window component.

Figure 7:
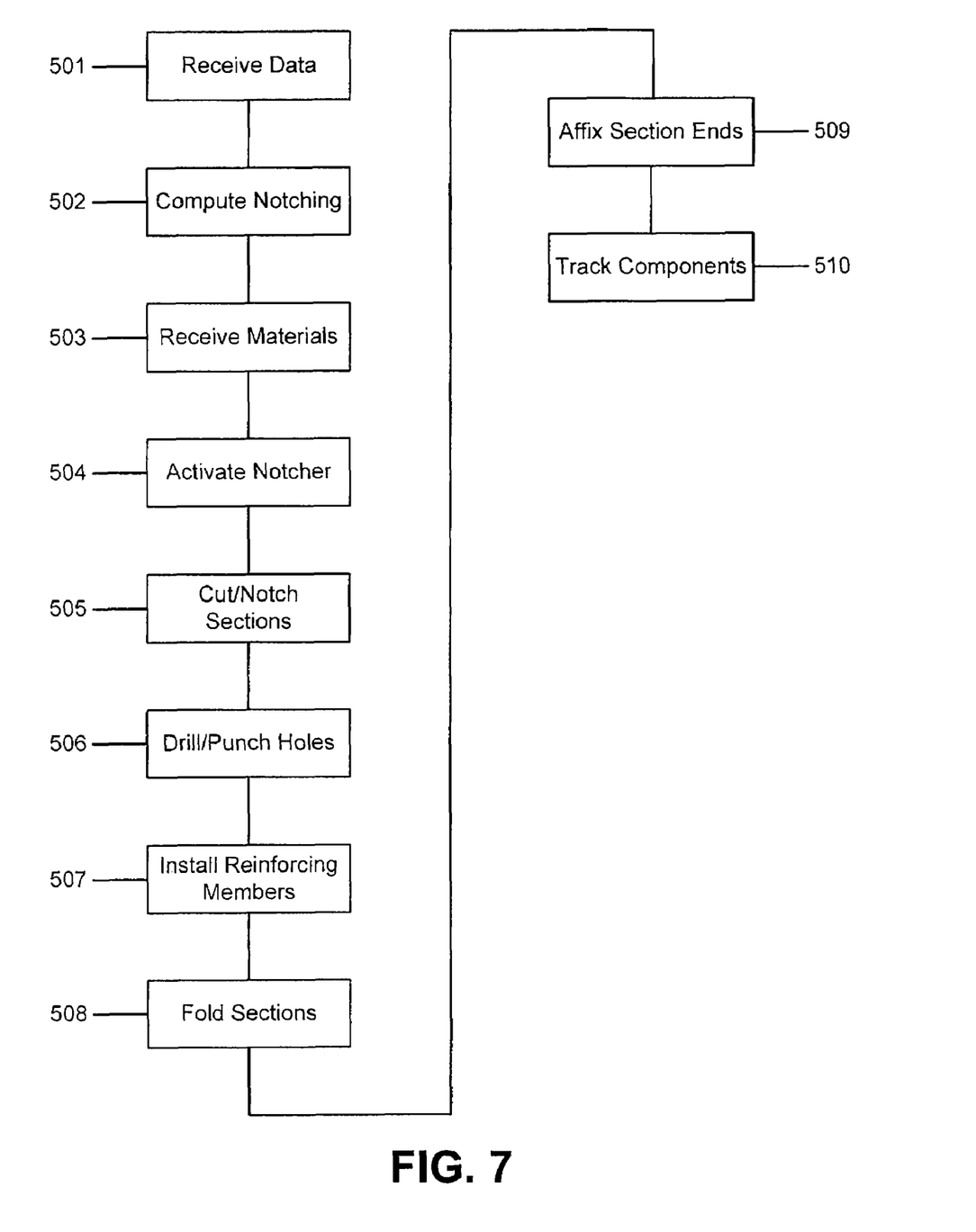
FIG. 7 illustrates a detailed flow chart of an automated embodiment of the present invention.

FIG. 7 shows a detailed flow chart of an automated process embodiment of the present invention. This present embodiment of the invention may employ automation techniques and technology to improve the quality and consistency of the manufacturing process while simultaneously reducing labor, production footprint and material costs. Although the steps of the process shown in this FIG. 7 accommodate automation technology, the reader should understand that in alternative envisioned embodiments, any of the steps can be performed in a manual fashion.

Data profiles are received (501) by a control processor. A typical control processor is a programmable computer, although alternative processors, such as single purpose electronic devices could be substituted without departing from the concept of this invention. The data profiles include information related to the desired window shape and size, lineal material, and optionally the texture, color, glass or other medium type and/or other features. Optimization schedules may be created to efficiently use the available lengths of lineal materials based on stored production data profiles and lineal material inventory data. Lineal materials are typically selected from but are not necessarily limited to composites, plastic, metal, and wood reinforced with a flexible back portion or additional treatment that improve material flexibility. Textures include patterns, roughness and the like in the surface of the lineal material. Window shapes supported by this invention include square, rectangular, triangular, octagonal, and other polygonal shapes, circular, oval, curved shapes, or combinations thereof. Moreover, the window shapes may be either an irregular or normal polygon, and include trapeziums, half rounds, and ellipses.

The data profile also typically includes dimensional information, such as height, width and thickness of desired frame(s). This dimensional information may be input, or received by the processor in various units, including either English units (inches, feet, yards) and/or metric units (centimeters, meters). The data profile also includes information concerning the type and size of desired transparent, or semi-transparent, material. Typically, this material is glass, although plastic, acrylic, composite or other generally transparent, window compatible material can be substituted without departing from the concept of this invention. Also, typically described in the data profile is the frame material, color and texture used and desired, as well as such other window-type features, such as single pane windows, double pane windows, horizontal sliders, single or double hung sliders, patio doors, shaped windows, picture windows, and other types of windows known in the art.

The control processor, which may be a distributed processor in communication with a processor receiving the data, a separate processor computing, and a still other processor controlling the manufacturing equipment and perhaps a further processor tracking the process of the window components through the process of this invention, computes (502) the cutting and notching of the received material. This computation step (502) preferably includes calculating the length of window frame components, the positioning of the notches, as well as the angle or shape of the notch. The distance between notches is adjusted according to a stretch treatment, which may include tolerance ranges up to 0.500 inches to adjust for stretching of the lineal materials during folding. In a particularly preferred embodiment, the stretch treatment reduces the length of each section between 0.03 in. and 0.125 in. per notch to be folded. Thus, an end frame section will have approximately half the stretch treatment of an intermediate frame section.

In the context of a square or rectangular window, the notch angles would be 45 degrees and the number of elongated sections would be four. For an octagon, the notch angles would be 22.5 degrees and the number of elongated sections would be eight. In order to provide certain curved window shapes the notch angles may also be non-linear. The notch angles are selectable generally from 0 degrees to 180 degrees to provide for a selection of a generally continuous set of window shapes. The number of notch angles is also selectable, with four angles in each notch being typical.

Lineal materials are received (503) in a single piece form and often have a nail fin provided on the outer perimeter. A notcher is provided to perform the cutting operation for cutting the received lineal materials to the required length of the window frame component and to create the notches defining the sections (also referred to as elongated sections) of the window component. A wide variety of lineal materials may be used with this invention, including, but not necessarily limited to vinyl, plastic, polymers, wood, metal, fiberglass and/or other composite materials.

Once the lineal materials are received (503), preferably according to a materials optimization schedule, the processor activates (504) the notcher using the notching sequences previously calculated to perform the cutting and notching sequences on the lineal material to produce a foldable lineal. In the present embodiment this activation (504) is a batch computation process. The notcher cuts (505) the lineal material to length and cuts the angled notches to define the frame sections. In various embodiments, the angled notches are made sequentially, in other embodiments multiple angled notches are made simultaneously.

In one embodiment of the process movement of the lineal material is done automatically, while in other embodiments, a person may be required or prompted to move the material as required to position for notching. In some embodiments, the notches define sections of equal length, in other embodiments; the notches define sections of unequal length. In some embodiments, a three-way cut may be used to produce the partial cut-through notches of the present embodiment. Drilling or punching (506) operations may then be performed to introduce openings in the construction material for drainage, air filtration, placement of hardware, routing of conduit or dimpling.

Reinforcing members may then be inserted (507) into the interior of the lineal material at the notches to facilitate joining and/or sealing of adjacent lineal sections. Suitable internal reinforcing members include corner locking components or "keys" configured to be fused or bonded to the lineal material after folding, for example through sonic, RF or thermal welding or injection of a polymer. Alternatively, any other suitable reinforcing member may be installed before of after folding of the lineal material to secure the corners or other joints.

An exemplary reinforcing member, according to one embodiment, includes a plastic body configured to substantially correspond to the profile of the interior of the lineal material. The reinforcing member may be configured such that it may be inserted in a notch formed in the lineal material and the lineal material may be folded to enclose the reinforcing member. Any number of extensions of the reinforcing member may be configured to extend into any number of interior portions of the lineal material. For example, the reinforcing member may include extensions for retaining the reinforcing member within the notched lineal material prior to folding and extensions for welding to the interior walls of the folded lineal material. The reinforcing member may be welded or bonded within the lineal material by any of the methods described herein.

The construction material is folded (508) to form one or more corners at the ends of the individual sections. After folding (508), the construction material takes on the shape of the desired window shape, such as a square, rectangle or other selected shape identified in the received (501) data, and an interior adapted to hold in place the selected transparent medium. The selected transparent medium is typically glass, although alternatives including plastic, acrylic and other similar transparent or semi-transparent materials can be substituted without departing from the concept of this invention.

In an alternative embodiment, the construction material is folded (508) after each angled notch cutting operation (505), so that with each fold, the appearance of the material increasingly resembles the desired shape and selected data profile. After folding the section ends, including the ends (see 103 and 112 of FIG. 3*a*) of the component and the notches (cumulatively now corners) are fixed (509) in place, typically through sonic or thermal welding of the joints and internal reinforcing member, or alternatively by the use of metal joining or metallurgical process (such as welding and the like) or mechanical fastener devices (such as screws, brackets, bolts and the like).

In an alternative embodiment, polymer composite material, such as an adhesive, may be injected at each corner thereby affixing the lineal material in the desired shape. This polymer composite may also enhance the seal in the corners and may also be used to retain the transparent medium in place in the interior of the frame component.

Throughout the process of this invention, the components may be tracked (510) to provide corresponding operator or machine instructions or for inventory or quality control purposes. In some embodiments, the tracking (510) may be facilitated by tracking indicia on the window components, lineal materials and/or sections for automatic or manual detection.

For example, the tracking indicia may be applied to the bulk lineal material. Detection of the tracking indicia at the notcher causes the processor to retrieve a data profile from the production database corresponding to a window component to be made from the detected lineal. Following notching, the tracking indicia are detected at a processing station to inform placement of internal reinforcing members within the notches formed in the lineal. The indicia may also inform folding and welding operations. For example, the indicia and the corresponding data profile may inform positioning of multiple sonic welding heads to contact multiple sides of a folded joint to sonically weld the internal reinforcing member at multiple points within the joint. The indicia and data profile may further inform assembly, packaging, and shipping operations.

Finally, while the present invention has been described above with reference to various exemplary embodiments, many changes, combinations and modifications may be made to the exemplary embodiments without departing from the scope of the present invention. The various components may be implemented in alternative ways, for example, for use in vinyl gate systems, interior moldings, casings, and the like. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

The invention claimed is:

1. A notching system configured to notch lineal material to be foldable into a window frame, said system comprising:
   a cutter configured to notch the lineal material; and
   a controller configured to position at least one of the lineal material and said cutter and to activate said cutter to produce notches in the lineal material defining first and second end sections and an intermediate section of a window frame, said controller further configured to adjust the length of said intermediate section relative to a finished production length by a first stretch treatment of up to about 0.5 in. and the length of one of said first and second end sections by a second stretch treatment of up to about 0.25 in.

2. The notching system of claim 1, wherein said controller is configured to produce said notches according to said first and second stretch treatments such that said intermediate section and said one of said first and second end sections are notched to unequal length and form substantially equal sides of the frame upon folding of the lineal material.

3. The notching system of claim 1, wherein said first stretch treatment is between 0.03 in. and 0.25 in.

4. The notching system of claim 3, wherein said second stretch treatment is between 0.03 in. and 0.125 in.

5. The notching system of claim 4, wherein said first and second stretch treatments are at least about 0.03 in. per finished dimension between notches.

6. The notching system of claim 1, wherein said notches formed by said cutter are configured to receive an internal reinforcing member.

7. The notching system of claim 6, wherein said internal reinforcing member is configured to be fused to the interior surface of the lineal material.

8. The notching system of claim 7, further comprising a welder configured to weld said reinforcing member within a joint formed by folding said one of said notches.

9. The notching system of claim 7, further comprising an automated Installer configured to place said internal reinforcing member within one of said notches.

10. The notching system of claim 1, wherein one of said cutter and a second cutter is configured to cut a nail fin extending from the lineal material at a location substantially corresponding to the location of one of said notches.

* * * * *